United States Patent
Bartosch et al.

(10) Patent No.: US 8,857,181 B2
(45) Date of Patent: Oct. 14, 2014

(54) DRIVE TRAIN, IN PARTICULAR VEHICLE DRIVE TRAIN

(75) Inventors: Stephan Bartosch, Rammingen (DE); Jürgen Berger, Gerstetten (DE)

(73) Assignee: SteamDrive GmbH, Heidenheim (DE)

( * ) Notice: Subject to any disclaimer, the term of this patent is extended or adjusted under 35 U.S.C. 154(b) by 798 days.

(21) Appl. No.: 12/393,440

(22) Filed: Feb. 26, 2009

(65) Prior Publication Data

US 2009/0217889 A1    Sep. 3, 2009

Related U.S. Application Data

(63) Continuation of application No. PCT/EP2008/000777, filed on Jan. 31, 2008.

(30) Foreign Application Priority Data

Feb. 5, 2007   (DE) .......................... 10 2007 006 420

(51) Int. Cl.
| | |
|---|---|
| *F02G 3/00* | (2006.01) |
| *F01K 23/10* | (2006.01) |
| *F02B 41/00* | (2006.01) |
| *F22B 3/06* | (2006.01) |
| *F28C 3/00* | (2006.01) |
| *F16D 57/00* | (2006.01) |
| *F02G 5/00* | (2006.01) |
| *F01K 23/06* | (2006.01) |

(52) U.S. Cl.
CPC ................ *F02G 5/00* (2013.01); *Y02T 10/166* (2013.01); *F01K 23/065* (2013.01)
USPC .................. 60/616; 60/618; 122/26; 188/290

(58) Field of Classification Search
USPC ................ 60/614–624; 122/26; 188/290–296
See application file for complete search history.

(56) References Cited

U.S. PATENT DOCUMENTS

| | | | |
|---|---|---|---|
| 4,114,734 A | 9/1978 | Bultmann | |
| 4,130,321 A | 12/1978 | Fleck | |

(Continued)

FOREIGN PATENT DOCUMENTS

| | | | |
|---|---|---|---|
| DE | 30 21 691 A1 | 4/1981 | |
| DE | 4408349 A1 | * 10/1994 | |

(Continued)

OTHER PUBLICATIONS

PCT/EP2008/000777 International Preliminary Report on Patentability.

(Continued)

*Primary Examiner* — Christopher Jetton
(74) *Attorney, Agent, or Firm* — Taylor IP, P.C.

(57) ABSTRACT

A drive train, especially a vehicle drive train, includes: an engine for supplying drive power into the drive train; a cooling circuit in which a cooling medium is revolved in order to cool the engine or an electric generator or another unit; an expansion machine which is driven with fluid or steam as a working medium and by way of which additional drive power can be supplied to the drive train or which drives an electric generator or another unit, the cooling medium of the cooling circuit being simultaneously the working medium of the expansion machine; and a bypass to the expansion machine which is provided through which the working medium of the expansion machine is forced through a switching valve or can be guided past the expansion machine automatically by the prevailing pressure conditions.

7 Claims, 1 Drawing Sheet

(56) References Cited

U.S. PATENT DOCUMENTS

| | | | |
|---|---|---|---|
| 4,182,127 A | | 1/1980 | Johnson |
| 4,197,712 A | * | 4/1980 | Zwick et al. ............... 62/50.3 |
| 4,235,320 A | | 11/1980 | Polak et al. |
| 5,121,607 A | | 6/1992 | George, Jr. |
| 5,176,000 A | * | 1/1993 | Dauksis ..................... 60/618 |
| 5,195,881 A | | 3/1993 | George, Jr. |
| 5,241,817 A | | 9/1993 | George, Jr. |
| 5,279,262 A | * | 1/1994 | Muehleck ................. 122/26 |
| 5,351,487 A | | 10/1994 | Abdelmalek |
| 6,450,283 B1 | * | 9/2002 | Taggett ..................... 180/304 |
| 7,454,910 B2 | | 11/2008 | Hamada et al. |
| 7,454,911 B2 | | 11/2008 | Tafas |
| 2010/0050635 A1 | | 3/2010 | Bartosch et al. |

FOREIGN PATENT DOCUMENTS

| | | | |
|---|---|---|---|
| DE | 19716299 C1 | | 2/1998 |
| DE | 197 06 090 A1 | | 8/1998 |
| DE | 198 33 891 A1 | | 2/2000 |
| DE | 101 03 403 C1 | | 1/2002 |
| DE | 102 21 157 A1 | | 4/2003 |
| DE | 10 2006 008 110 A1 | | 8/2007 |
| DE | 10 2007 006 420 A1 | | 8/2008 |
| GB | 2 333 584 A | | 1/1998 |
| JP | 57206709 | | 12/1982 |
| JP | 59221409 | | 12/1984 |
| JP | 60139538 | | 7/1985 |
| JP | 60139538 A | * | 7/1985 |
| JP | 688523 | | 3/1994 |
| JP | 06088523 A | * | 3/1994 |
| WO | 2011/095321 A1 | | 8/2011 |

OTHER PUBLICATIONS

International Search Report dated Aug. 25, 2008 for PCT/EP2008/000777 (12 pages).

English translation of Written Opinion of the International Searching Authority for PCT/EP2008/000777 (7 pages).

European Search Report (dated Jan. 13, 2009) and opinion for EP 08 01 9571 (4 pages).

Communication dated Aug. 24, 2009 from European Patent Office for EP 08 707 464.7-2311 (3 pages).

Communication dated May 14, 2010 from European Patent Office for EP 08 019 571.2-2311 (4 pages).

English translation of WO 2011/095321 (listed above)(figures omitted from translation)(25 pages).

Communication dated May 17, 2010 from European Patent Office for EP 08 019 571.2-2311 (4 pages).

Communication dated Apr. 5, 2012 from European Patent Office for European Application No. 08019571.2-2311 (2 pages).

English translation of claims filed on or about Mar. 12, 2012 in European Patent Office for European Application No. 08019571.2-2311 (2 pages).

Communication dated Dec. 27, 2011 from European Patent Office for European Application No. 08019571.2-2311 (22 pages).

* cited by examiner

DRIVE TRAIN, IN PARTICULAR VEHICLE DRIVE TRAIN

CROSS REFERENCE TO RELATED APPLICATIONS

This is a continuation of PCT application No. PCT/EP2008/000777, entitled "DRIVE TRAIN, IN PARTICULAR VEHICLE DRIVE TRAIN", filed Jan. 31, 2008, which is incorporated herein by reference.

BACKGROUND OF THE INVENTION

1. Field of the Invention

The present invention relates generally to a drive train, and especially to a drive train for vehicles, and usually a drive train for motor vehicles.

2. Description of the Related Art

It is already known to dispose in drive trains both a hydrodynamic retarder as well as a steam-driven expansion machine—see patent specifications U.S. Pat. No. 5,121,607, U.S. Pat. No. 5,241,817 and U.S. Pat. No. 5,195,881 for example. According to these documents, a transmission contains both a hydrodynamic retarder in order to brake the vehicle in a hydrodynamic way and a steam-driven expansion machine, which is also known as an expander, in order to drive the vehicle. The expansion machine can be provided as an additional drive source in connection with a combustion engine. It is also proposed however to drive the vehicle exclusively by way of a charged screw expander in which hot combustion gases are expanded. It is further proposed to also use the expander as a brake for the vehicle.

Although different units are used in a drive train according to the mentioned specifications in order to drive the vehicle in the most energy-efficient manner, there is still room for improvements due to the rising demands made on energy efficiency. Possibilities are especially sought to better utilize the heat originating in the drive train, and especially in a motor vehicle.

JP 59 221409A describes a drive train, especially a vehicle drive train, with an engine for supplying drive power into the drive train; with a cooling circuit in which a cooling medium is revolved in order to cool the engine or an electric generator or another unit; with an expansion machine which is driven with fluid or steam as a working medium and by way of which additional drive power can be supplied to the drive train or which drives an electric generator or another unit; the cooling medium of the cooling circuit is simultaneously the working medium of the expansion machine. Reference is hereby made to the following documents regarding the further state of the art:

JP 06 088523 A
JP 57 206709 A
U.S. Pat. No. 5,176,000 A
DE 197 16 299 C1.

What is needed in the art is a drive train which is improved with respect to heat utilization over the state of the art. In addition, production, maintenance and upkeep for such a drive train shall be as cost-effective as possible and complex constructions shall be avoided to the highest possible extent.

SUMMARY OF THE INVENTION

The present invention provides a drive train, especially a vehicle drive train, which includes: an engine for supplying drive power into the drive train; a cooling circuit in which a cooling medium is revolved in order to cool the engine or an electric generator or another unit; an expansion machine which is driven with fluid or steam as a working medium and by way of which additional drive power can be supplied to the drive train or which drives an electric generator or another unit, the cooling medium of the cooling circuit being simultaneously the working medium of the expansion machine, a bypass to the expansion machine being provided through which the working medium of the expansion machine is forced through a switching valve or can be guided past the expansion machine automatically by the prevailing pressure conditions.

According to a first embodiment in accordance with the invention, the drive train, which is especially arranged as a vehicle drive train, includes an engine for supplying drive power to the drive train. The engine can be a combustion engine, especially a diesel engine or any other piston engine. Other engines are also considered, e.g. electrically or electrodynamically working machines, screw-type machines such as a screw expander, or turbines, especially a gas turbine. A fuel cell drive or other engines not mentioned here are possible.

The drive train includes a cooling circuit which is usually arranged as a closed circuit with a storage container, with a cooling medium being revolved in the cooling circuit in order to cool the engine. One or several further units, especially accessory units, which are provided for operating the engine, the drive train or the vehicle, can be cooled by way of the cooling circuit in addition to the engine as an alternative or in addition.

An expansion machine is further arranged in the drive train. The expansion machine works with a fluid or steam as a working medium. Mechanical energy is produced by expansion of said working medium in the expansion machine which is supplied as additional drive power into the drive train or which is used to drive another unit or accessory unit such as an electric generator, a pump or the like. An oil pump, a fuel pump or a water or cooling-medium pump can be considered for example.

In order to prevent the required space and costs for an additional heat exchanger and to optimize the energy balance, the cooling medium of the cooling circuit is simultaneously the working medium of the expansion machine. As a result, the cooling medium of the cooling circuit flows into the expansion chamber of the expansion machine and expands there by emitting mechanical work or power.

An air/cooling medium heat exchanger can be provided in the cooling circuit as is known from motor vehicles in the engine circuit, by way of which heat is carried off from the cooling medium. In order to increase heat transfer to the ambient environment, a fan is provided for example which causes a forced flow of ambient air over the heat exchanger surfaces. This heat exchanger, which usually is disposed in the direction of flow behind the expansion machine and in front of a cooling-medium pump, can either act as a condenser in order to partly or fully condense the working medium in the case of a steam-driven expansion machine, or an additional condenser is provided in the direction of flow between the expansion machine and the air/cooling medium heat exchanger in which the working medium of the expansion machine is condensed partly or in full. A single heat exchanger is thus especially provided in the cooling circuit, by way of which the heat of the working medium or cooling medium is carried off to the ambient environment, or exclusively two heat exchangers are provided in the cooling circuit of which at least one works as a condenser in order to carry off heat from the cooling medium or the working medium to the ambient environment. It is understood that it is also possible in accordance with an alternative embodiment to provide three or more heat exchangers.

A hydrodynamic retarder can be additionally provided in the cooling circuit, which retarder is cooled directly by way of the cooling medium, which means that the cooling medium is simultaneously the working medium of the retarder, or which is cooled indirectly by way of the cooling medium, which means the working medium of the retarder is separated from the cooling medium of the cooling circuit, with the heat transfer usually occurring in a liquid/liquid heat exchanger which is especially mounted on the retarder or in the area of the retarder. In such an embodiment with a retarder incorporated directly or indirectly, the expansion machine is advantageously provided in the direction of flow behind the retarder, so that the heat originating in the retarder contributes to the heating of the working medium of the expansion machine before the same expands in the expansion machine.

Such a hydrodynamic retarder includes a rotor for example which revolves continually or can be made to rotate optionally by way of a separating clutch and which is opposite to a stator or a rotor revolving in the opposite direction and forms with the same a working chamber, especially a toroidal working chamber, in which a hydrodynamic circuit of the working medium for transferring torque or rotary power from the rotor to the stator or the counterrotating rotor.

In order to ensure sufficient evaporation and/or overheating of the working medium leaving the retarder, a steam generator and/or heat exchanger or a plurality of heat exchangers can be provided in the direction of flow behind the retarder and in front of the expansion machine which is/are supplied advantageously with heat occurring in the drive train and/or with heat generated by an additional burner in order to cause the required introduction of energy into the working medium. For example, the exhaust heat of the engine provided in the drive train can be used for generating steam or preheating the working medium of the expansion machine.

According to a second embodiment in accordance with the invention, a hydrodynamic retarder is provided in a drive train, especially a vehicle drive train, which again may include an engine, e.g. a combustion engine, especially a diesel engine or other piston engine or also in the form of other engines, in order to supply drive power to the drive train, which hydrodynamic retarder is in continual drive connection with the drive train or optionally can be switched into a drive connection with the drive train in order to exert a braking torque on the drive train. The retarder is arranged as is known and/or as explained above and includes a working chamber which is filled continually with a working medium or which can be supplied optionally with a working medium in order to generate the desired braking torque in a hydrodynamic way.

Furthermore, an expansion machine which is driven with fluid or steam as a working medium is provided by way of which drive power can be supplied to the drive train. The drive power of the expansion machine can be used alternatively or additionally to drive an electric generator or any other unit and/or accessory unit.

The working medium of the retarder is simultaneously the working medium of the expansion machine, so that the heat which is incurred during the operation of the retarder and which is introduced into the working medium of the retarder can be used in the expansion machine for expanding and generating mechanical work or power.

In the common working medium circulation of the retarder and the expansion machine which is advantageously arranged as a closed circuit with a storage container for the working medium, a condenser can be provided in order to partly or fully condense the working medium flowing from the expansion machine. Furthermore, a feed pump, especially a turbopump or positive-displacement pump, can be provided in order to maintain a working medium circulation. It is alternatively also possible to arrange the retarder simultaneously as a feed pump which has a pumping effect on the working medium in order to pump the same into the working medium circuit. The retarder can then be the only feed pump or be provided in addition to another pump in the circuit which has a pumping effect on the working medium.

A working medium that can be used in the embodiments in accordance with the invention is water or a water mixture for example. In particular, an ionic liquid can also be considered as a working medium or a component of the working medium. Other working media such as oil or an oil mixture are possible. A working medium that is capable of evaporation is usually provided however in order to arrange the expansion machine as a steam-driven expansion machine.

In the working medium circuit or the cooling medium circuit, a bypass to the expansion machine and/or the retarder can be provided by way of which the working medium can be guided partly or entirely past the expansion machine and/or the retarder. In the case of a series connection of the expansion machine and the retarder, a common bypass can also be provided with which the working medium is guided simultaneously past the expansion machine and the retarder. It is understood that it is also possible to arrange the retarder and the expansion machine parallel with respect to each other in the working medium circuit or cooling circuit, and to especially provide a further parallel branch to the retarder and the expansion machine as a bypass.

The division of the working medium flow to the expander and/or the retarder and the bypass can occur "automatically" by pressure conditions occurring in the working medium circuit or in a forced manner, which in the latter case occurs by providing respective control valve and/or switching valves. For example, a directional control valve can be provided in the branch-off dividing the working medium in the direction of flow before the retarder or the expansion machine, which directional control valve directs the working medium flow either into the bypass or the retarder or the expansion machine, or makes a division of the working medium flow to both ways. As an alternative or in addition, a respective directional control valve can also be provided at the branching point behind the retarder or the expansion machine in which the working medium flows from the bypass and the retarder or the expansion machine are joined again. As an alternative or in addition, one or several control valves or controllable throttle valves can be provided in the bypass or parallel thereto in series to the retarder or the expansion machine in order to provide a forced division of the working medium flow to the bypass or the retarder or the expansion machine.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
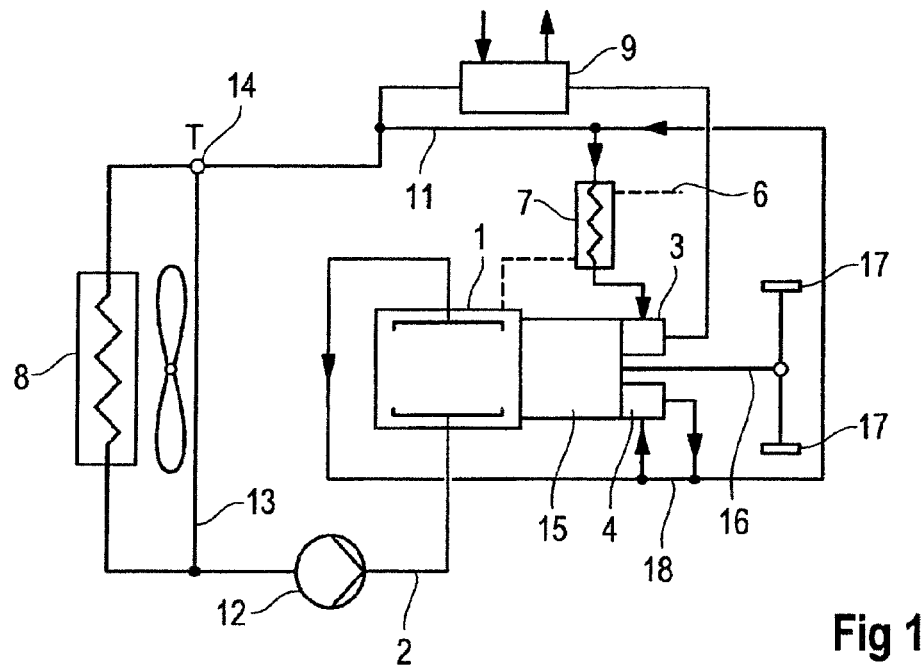
FIG. 1 shows a first embodiment in accordance with the invention with an expansion machine and a retarder whose working medium is simultaneously the cooling medium of the cooling circuit.

The embodiments shown in the drawings relate to drive trains of a motor vehicle for example, which shall mean any vehicle driven by an engine such as a passenger car, a commercial vehicle, a rail vehicle, a ship and the like. The invention can principally also be applied to aircraft.

The drawings show an engine 1 which is arranged as an internal combustion engine such as a diesel engine. Engine 1 is cooled by way of a cooling circuit 2. The cooling medium in the cooling circuit is revolved by way of a pump 12. The cooling medium is usually water or a water mixture.

Heat which is introduced into the cooling medium by the engine 1 for example is carried off through an air/cooling medium heat exchanger 8 to the ambient environment. A bypass 13 is provided on the air/cooling medium heat exchanger 8 which is switched via a thermostatic valve depending on the cooling medium temperature at the location of the thermostatic valve 14 in order to direct a more or less large percentage of the cooling medium flow through the air/cooling medium heat exchanger 8 and/or the bypass 13.

A transmission 15 is connected to the engine 1 in order to more or less convert the speed or the torque of the engine 1 and to supply the same via the transmission output shaft 16 to the drive wheels 17. Engine 1 is arranged on the primary side of the transmission 15. The output shaft 16 on the secondary side. On the secondary side of the transmission 15, a hydrodynamic retarder 4 and a steam-driven expansion machine 3 are further arranged according to FIG. 1, e.g. each on a power take-off or, in the case of the expansion machine 3, better designated as power take-off. Both the retarder 4 and the expansion machine 3 are flowed through by the cooling medium as working medium permanently or optionally, depending on the embodiment. A bypass 11 is provided with respect to the working medium flow parallel to the expansion machine 3. A bypass 18 is accordingly provided for the retarder 4. Although not shown herein, the flow through the respective valves and/or throttles between the bypasses 11, 18 and the expansion machine 3 or retarder 4 can be switched alternatively.

An exhaust heat exchanger 7 is provided in the cooling circuit 2 in the direction of flow in front of the expansion machine 3, which exhaust heat exchanger 7 is arranged in the exhaust flow 6 of the engine 1 and which is used to introduce heat from the exhaust flow 6 into the cooling medium of the cooling circuit which is simultaneously the working medium of the expansion machine 3. A condenser 9 is provided in the cooling circuit 2 behind the expansion machine 3 in the direction of flow of the cooling medium or the working medium in order to condense the working medium of the expansion machine 3 before it is supplied to the air/cooling medium heat exchanger 8, which usually occurs in completely liquid form.

All heat-generating units which are cooled by way of the cooling circuit 2 or their heat exchangers are advantageously arranged in a separate working medium circuit of the units before the expansion machine 3 in the direction of flow in order to utilize their heat for expansion and thus for generating mechanical power. As a result, the expansion machine 3, is the last unit apart from the condenser 9 which can be omitted according to an embodiment in which a purposeful exchange of heat occurs before the air/cooling medium heat exchanger 8.

Figure 2:
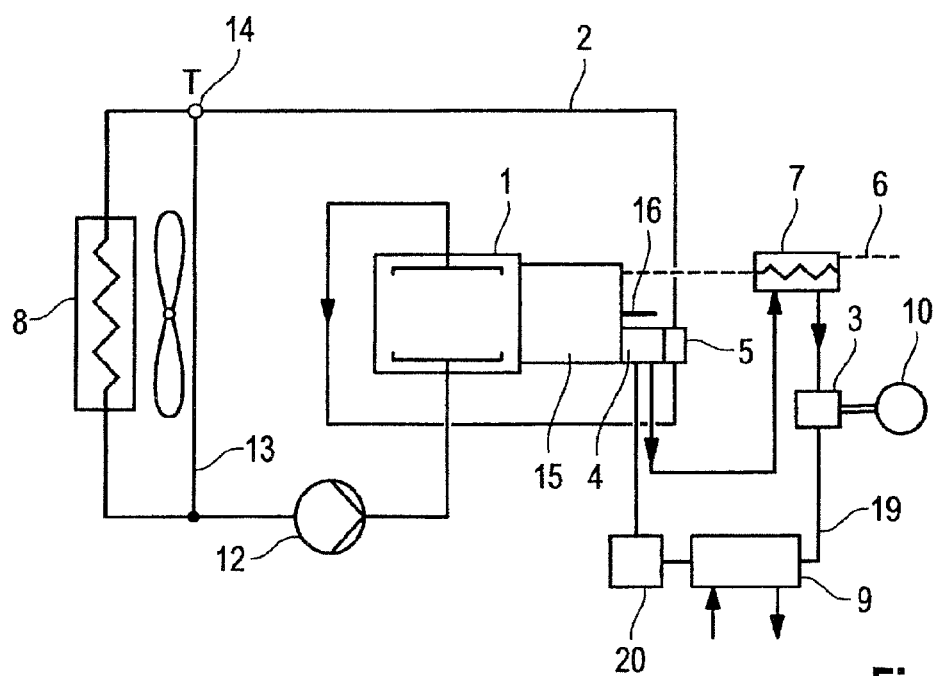
FIG. 2 shows a second embodiment in which a working medium circuit is provided which is separated from the cooling circuit and the working medium of a retarder is simultaneously the working medium of the expansion machine.

The embodiment according to FIG. 2 coincides in many points with that of FIG. 1, with the respective elements being marked with the same reference numerals. Departing from this, a working medium circuit 19 is provided which is separate from the cooling circuit 2 and which guides the working medium of retarder 4 and the expansion machine 3.

Retarder 4 is arranged again as a secondary retarder. It is understood that the arrangement of the retarder 4 as a primary retarder, which means it is connected on the primary side of transmission 15, is considered in all embodiments in accordance with the invention with a retarder 4. While the rotor of a secondary retarder rotates depending on the travelling speed, the rotor of a primary retarder rotates depending on the speed of the engine 1.

The expansion machine 3 according to FIG. 2 is not used for the propulsion of the vehicle, but the drive of an accessory unit, which in this case is an electric generator 10. It is understood that other accessory units can be considered. It is also possible to utilize the electricity generated by generator 10 for the drive of the vehicle. A respective use of the mechanical propulsive power of the expansion machine 3 can also be considered in the embodiment according to FIG. 1.

In the working medium circuit 19, a condenser 9 is provided in the direction of flow behind the expansion machine 3 and an exhaust heat exchanger 7 in the direction of flow before the expansion machine 3, with the same goal as in FIG. 1. Furthermore, a storage container 20 for working medium is introduced in the direction of flow behind the condenser 9 in the working medium circuit 19.

In the illustrated embodiment, the working medium circulation 19 is free from a pump exerting a pumping action on the working medium. The pumping action of the retarder 4 is used for revolving the working medium in the working medium circuit 19. It is understood that it would be possible to provide an additional pump or a plurality of additional pumps in the working medium circuit 19.

Although not shown herein, bypasses and/or valves could also be provided in the working medium circuit 19 in order to guide the working medium flow past the retarder 4 and/or the expansion machine 3.

The cooling medium circuit 2 and the working medium circuit 19 are in a heat-transferring connection via a liquid/liquid heat exchanger 5. It is thus either possible to carry off heat from the working medium circuit 19 to the cooling circuit 2, e.g. before the working medium enters the retarder 4 in order to prevent an impermissible heating of the retarder 4, to transfer heat from the cooling circuit 2 into the working medium circuit 19, e.g. in the direction of flow behind the retarder 4 and before the expansion machine 3 in order to enable the utilization of the transferred heat in the expansion machine 3 or to preheat the working medium before it is introduced into the exhaust heat exchanger 7.

Both in the embodiment according to FIG. 1 as well as in the embodiment according to FIG. 2, a steam generator could be provided in addition in the direction of flow before the expansion machine 3 in order to evaporate the working medium in the expansion machine 3.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

1 Engine
2 Cooling circuit
3 Expansion machine
4 Hydrodynamic retarder
5 Liquid/liquid heat exchanger
6 Exhaust flow
7 Exhaust heat exchanger
8 Air/cooling medium heat exchanger
9 Condenser
10 Electric generator
11 Bypass
12 Pump
13 Bypass
14 Thermostatic valve
15 Transmission
16 Transmission output shaft
17 Drive wheels
18 Bypass
19 Working medium circulation
20 Storage container

What is claimed is:

1. A drive train, comprising:
a hydrodynamic retarder which one of is in and can be switched to a drive connection with the drive train, said hydrodynamic retarder including a working chamber which one of is and can be filled with a working medium in order to generate a braking torque in a hydrodynamic way;
an expansion machine which is driven with one of a fluid and steam as a working medium, said expansion machine configured for one of supplying a drive power to the drive train and driving one of said electric generator and another unit, said working medium of said retarder being simultaneously said working medium of said expansion machine;
an engine; and
a cooling circuit in which a cooling medium is revolved to cool said engine, said working medium of said retarder and said expansion machine and said cooling medium being fluidly decoupled from one another and being thermally coupled to one another at said hydrodynamic retarder.

2. The drive train according to claim 1, wherein the drive train is a vehicle drive train.

3. The drive train according to claim 1, wherein said cooling circuit includes a condenser, said cooling circuit being closed, one of said cooling circuit including a feed pump and said retarder acting simultaneously as a feed pump.

4. The drive train according to claim 3, wherein only said retarder exerts a pumping action on said working medium.

5. The drive train according to claim 1, wherein said retarder is cooled by way of said cooling circuit in which said cooling medium is revolved in order to cool said engine.

6. The drive train according to claim 5, wherein said engine is an internal combustion engine which is configured for supplying drive power to the drive train.

7. The drive train according to claim 5, further comprising a liquid/liquid heat exchanger in which heat is transmitted from said working medium of said retarder to said cooling medium.

* * * * *